US008620936B2

(12) United States Patent
Lake et al.

(10) Patent No.: US 8,620,936 B2
(45) Date of Patent: Dec. 31, 2013

(54) SYSTEM AND METHOD FOR A DATA DICTIONARY

(75) Inventors: Peter J. Lake, Auburn, WA (US); Diana L. Herman, Dow, IL (US); Kenneth D. Bouvier, Renton, WA (US); Matthew K. Fay, Wentzville, MO (US)

(73) Assignee: The Boeing Company, Chicago, IL (US)

( * ) Notice: Subject to any disclaimer, the term of this patent is extended or adjusted under 35 U.S.C. 154(b) by 403 days.

(21) Appl. No.: 12/115,456

(22) Filed: May 5, 2008

(65) Prior Publication Data

US 2009/0276438 A1    Nov. 5, 2009

(51) Int. Cl.
*G06F 7/00*    (2006.01)
*G06F 17/30*    (2006.01)

(52) U.S. Cl.
USPC ......................................... 707/756; 707/602

(58) Field of Classification Search
None
See application file for complete search history.

(56) References Cited

U.S. PATENT DOCUMENTS

| | | | | |
|---|---|---|---|---|
| 5,329,446 | A * | 7/1994 | Kugimiya et al. | 704/4 |
| 5,404,507 | A * | 4/1995 | Bohm et al. | 1/1 |
| 5,850,561 | A * | 12/1998 | Church et al. | 715/234 |
| 5,987,474 | A * | 11/1999 | Sandifer | 1/1 |
| 6,292,806 | B1 * | 9/2001 | Sandifer | 705/26.1 |
| 6,353,779 | B1 * | 3/2002 | Simon et al. | 701/3 |
| 6,360,196 | B1 * | 3/2002 | Poznanski et al. | 704/8 |
| 6,665,662 | B1 * | 12/2003 | Kirkwood et al. | 1/1 |
| 6,771,275 | B1 * | 8/2004 | Cook et al. | 345/604 |
| 6,950,829 | B2 * | 9/2005 | Schlabach et al. | 1/1 |
| 7,706,979 | B1 * | 4/2010 | Herwitz | 701/301 |
| 7,860,706 | B2 * | 12/2010 | Abir | 704/4 |
| 7,996,402 | B1 * | 8/2011 | Gravano et al. | 707/736 |
| 2001/0032114 | A1 * | 10/2001 | Sinex | 705/9 |
| 2002/0046214 | A1 * | 4/2002 | Sandifer | 707/104.1 |
| 2002/0103865 | A1 * | 8/2002 | Lilly | 709/205 |
| 2002/0111789 | A1 * | 8/2002 | Hull | 704/4 |
| 2002/0169697 | A1 * | 11/2002 | Hicks et al. | 705/28 |
| 2003/0083862 | A1 * | 5/2003 | Hu et al. | 704/9 |
| 2003/0115210 | A1 * | 6/2003 | Leonard et al. | 707/102 |
| 2003/0187823 | A1 * | 10/2003 | Ahl et al. | 707/1 |
| 2003/0204405 | A1 * | 10/2003 | Hanson et al. | 705/1 |
| 2004/0039499 | A1 * | 2/2004 | Felke et al. | 701/29 |
| 2004/0103116 | A1 * | 5/2004 | Palanisamy et al. | 707/104.1 |

(Continued)

OTHER PUBLICATIONS

Automatic expansion of abbreviations by using contect and character information, Terada et al, Information processing and management 40, pp. 31-45, 2004.*

(Continued)

*Primary Examiner* — Augustine K Obisesan
(74) *Attorney, Agent, or Firm* — Haynes and Boone LLP (57) ABSTRACT

In accordance with one or more embodiments, a system for facilitating transfer of data and information over a network includes a database component for storing data and information related to a machine and at least one part thereof, a communication component adapted to communicate with a user via a user device over the network, and a processing component adapted to receive a request for data and information from the user over the network via the user device and process the request by retrieving data and information from the database component related to the machine or the at least one part thereof specified by the user passed with the request. The communication component is adapted to transfer the data and information related to the machine or the at least one part thereof from the database component to the user device for viewing by the user on the user device.

15 Claims, 4 Drawing Sheets

(56) References Cited

U.S. PATENT DOCUMENTS

| | | | |
|---|---|---|---|
| 2004/0122656 | A1* | 6/2004 | Abir .................................... 704/4 |
| 2004/0153463 | A1* | 8/2004 | Sasai et al. .................... 707/100 |
| 2005/0187721 | A1* | 8/2005 | Baust et al. ..................... 702/34 |
| 2006/0074845 | A1* | 4/2006 | Grossmann ....................... 707/1 |
| 2006/0106757 | A1* | 5/2006 | Sakai et al. ....................... 707/2 |
| 2006/0117252 | A1* | 6/2006 | Du et al. ....................... 715/514 |
| 2006/0271561 | A1* | 11/2006 | Schlachta-Fairchild et al. ............................... 707/10 |
| 2007/0016550 | A1* | 1/2007 | Oodake ............................. 707/1 |
| 2007/0220037 | A1* | 9/2007 | Srivastava et al. ............ 707/102 |
| 2008/0021604 | A1 | 1/2008 | Bouvier et al. |
| 2008/0189257 | A1* | 8/2008 | Wiseman et al. ................. 707/4 |
| 2009/0063546 | A1* | 3/2009 | Sullivan et al. ............... 707/102 |

OTHER PUBLICATIONS

From technical jargons to plain English for application, Ogden et al, Journal of applied behavioral analysis, vol. 44 pp. 449-458, 1991.*

Online correction and translation of industrial text, Van dan Steen et al, ASLIB Nov. 10-11, 1992.*

Resolving maintainace aid/data collection paradoxes, Munzo et al, IEEE 1988.*

A data warehouse to support condition based maintenance (CBM), Henderson et al, May 2005.*

Information Retrieval in Digital Libraries: Bringing Search to the Net, Schatz et al, Science 275, 327 , 1997.*

Automatic Detection of Thesaurus Relations for Information Retrieval Applications, Ruge et al, Computer Science, Technical University of Munich, 1997.*

A Terminology Data Bank for Translators (TEAM), Schulz et al, Translators' Journal, vol. 25, p. 211-229, 1980.*

Automatic expansion of abbreviations by using context and character information, Terada et al, Information Processing and Management 40, pp. 31-45, 2004.*

Technical Terminology as a Critical Resource, Dowdall et al, 1995.*

Identifying and Translating Technical Terminology, Dagan et al, 1994.*

Effect of Domain-Specific Corpus in Compositional Translation Estimation for Technical Terms, Tonoike et al, 2005.*

Text Mining Techonology, printout from http://www.megaputer.com/text_mining.php., 2007.

* cited by examiner

SYSTEM AND METHOD FOR A DATA DICTIONARY

TECHNICAL FIELD

The present disclosure relates generally to data retrieval and, more particularly, to a data dictionary having an enhanced query mechanism.

BACKGROUND

In the aviation industry, airline companies are provided with maintenance documents and manuals for facilitating maintenance, repair and service schedules of aircraft. Some of the maintenance documents and manuals are provided by aircraft manufacturers based on feedback from airline service personnel and are typically prepared for specific aircraft owned by a specific airline company in response to aviation safety standards.

When extracting applicable data and information from maintenance documents and manuals, a technician may have to rely on extensive technical knowledge in determining query keywords. Once the keywords are known a complex query based on Structured Query Language (SQL) is needed to search a database having the maintenance documents and manuals stored therein. Because the search criteria can be complicated, maintenance documents and manuals can be difficult to text mine for specific topics.

In general, data extraction is labor intensive and existing tools are underutilized because of there complexity. Therefore, a simpler way to extract relevant data and information from maintenance documents and manuals is needed.

SUMMARY

Systems and methods disclosed herein, in accordance with one or more embodiments, provide translation of machine component nomenclature, abbreviations, and acronyms into search criteria to extract relevant data information from a database. Embodiments of the present disclosure automatically define search criteria and correlates engineering definitions (machine component nomenclature, abbreviations and acronyms) with word strings and synonyms that occur in machine maintenance log book text.

In accordance with one or more embodiments, a system for facilitating transfer of data and information over a network includes a database component for storing data and information related to a machine and at least one part thereof, a communication component adapted to communicate with a user via a user device over the network, and a processing component adapted to receive a request for data and information from the user over the network via the user device and process the request by retrieving data and information from the database component related to the machine or the at least one part thereof specified by the user passed with the request. The communication component is adapted to transfer the data and information related to the machine or the at least one part thereof from the database component to the user device for viewing by the user on the user device.

In various implementations, the processing component is adapted to retrieve an engineering description related to the machine or the at least one part thereof specified by the user passed with the request. The processing component is adapted to translate the engineering description into common language terms. The processing component is adapted to identify technical synonyms of the common language terms.

In accordance with another embodiment of the present disclosure, a method for facilitating transfer of data and information over a network includes communicating with a user via a user device over the network, receiving a request for data and information related to a machine or at least one part thereof from the user via the user device over the network, processing the request by accessing data and information related to the machine or the at least one part thereof from a database component specified by the user passed with the request, and transferring the data and information related to the machine or the at least one part thereof to the user device for viewing by the user on the user device.

In accordance with another embodiment of the present disclosure, a method for facilitating transfer of data and information over a network includes receiving a request for data and information related to a machine or at least one part thereof from a user via a user device over the network, accessing data and information related to the machine or the at least one part thereof based on user input passed with the request, retrieving an engineering description related to the machine or the at least one part thereof based on the accessed data and information, translating the engineering description into common language terms, identifying technical synonyms of the common language terms, and transferring the technical synonyms to the user device for viewing by the user on the user device.

The scope of the disclosure is defined by the claims, which are incorporated into this section by reference. A more complete understanding of embodiments will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments and their advantages are best understood by referring to the detailed description that follows. It should be appreciated that like reference numerals are used to identify like elements illustrated in one or more of the figures.

DETAILED DESCRIPTION

In accordance with one or more embodiments, systems and methods disclosed herein facilitate a data dictionary adapted to translate nomenclature, abbreviations, and acronyms related to machine components (e.g., aircraft components) into search criteria that may be used to extract relevant data and information from a database. Relevant data and information may be stored in the database from maintenance log books and manuals including repair manuals and service manuals. The data dictionary correlates engineering descriptions and definitions (e.g., aircraft component nomenclature, abbreviations, and acronyms) with word strings and synonyms that occur in data and information related to maintenance log book text and maintenance manual text.

Figure 1:
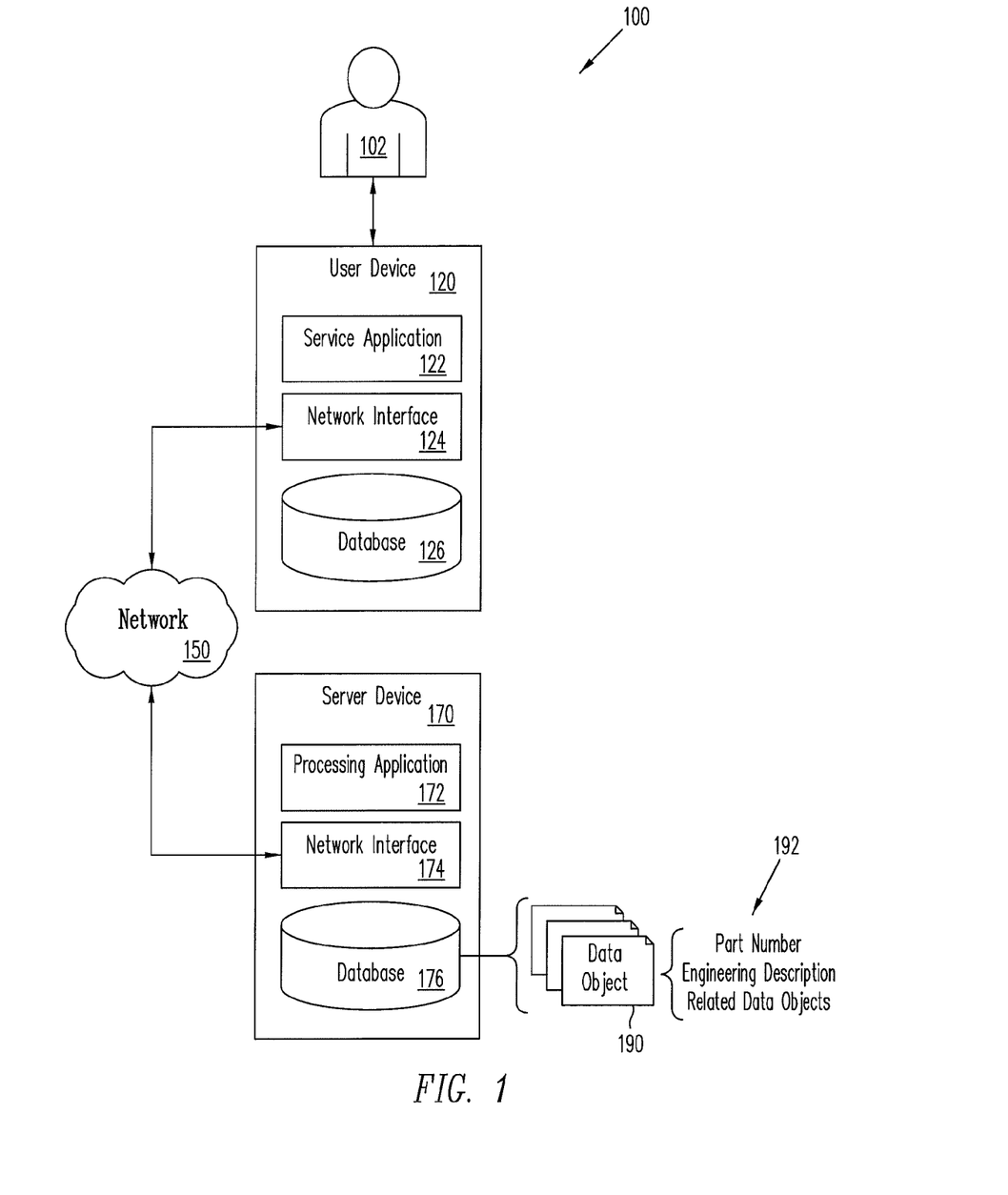
FIG. 1 shows a block diagram of a system configured to transfer data and information over a network, in accordance with an embodiment of the present disclosure.

FIG. 1 shows one embodiment of a block diagram of a system 100 configured to transfer data and information over a network 150. As shown in FIG. 1, the system 100 includes at least one user device 120 and at least one server device 170. The at least one user device 120 is configured to interface with a user 102, and the at least one server device 170 is configured to communicate with the user device 120 via the network 150.

The network 150, in one embodiment, may be implemented as a single network or a combination of multiple networks. For example, in one embodiment, the network 150 may comprise a wireless telecommunications network (e.g., cellular phone network) adapted to communicate with other communication networks, such as the Internet. In various other embodiments, the network 150 may include the Internet and/or one or more intranets, landline networks, wireless networks, and/or other appropriate types of communication networks adapted to communicate with a wireless telecommunications network.

The user device 120, in various embodiments, comprises a mobile communication and computing device, such as a cell phone, a personal digital assistant (PDA), a laptop, or various other generally known types of mobile communication and computing devices. The user device 120 may be implemented using any appropriate combination of hardware and/or software configured for wired and/or wireless communication over the network 150.

The user device 120, in one embodiment, includes a service application 122 that may be used by the user 102 to access and/or browse data and information made available to the user 102 by the server device 170 over the network 150. For example, the service application 122 may be implemented as a network browser to display maintenance data and information (e.g., documents and/or files related to a maintenance manual and/or instructions) provided by the server device 170 over the network 150.

In one implementation, the service application 122 processes relevant maintenance data and information to the user 102 for use in field maintenance activities. The service application 122 may generate one or more records made by the user 102 and store the one or more records in a local memory component, such as database 126.

In one implementation, the service application 122 provides access to data and information for operating and maintaining machinery, such as an airplane, and the service application 122 is adapted to store the accessed data and information. As described in detail herein, data and information may be retrieved from the server device 170, stored locally on the user device 120, and displayed for viewing by the user 102.

In one implementation, the service application 122 comprises software that is downloadable to the user device 120. The user device 120 is adapted to display data and information tailored to particular machinery as designated by the user 102 via user input, which may be stored in database 126 of the user device 120. The user inputted data and information may be transmitted to the server device 170 via the network 150 for storage and processing by the server device 188. This data and information may be associated with an appropriate work task assigned to the particular machinery.

The user device 120, in one embodiment, may include a network interface application 124, which may be used by the user 102 to communicate with the server device 170 via the network 150. For example, the network interface application 124 may utilize a graphical user interface (GUI) in connection with the service application 122 for viewing of data and information including maintenance data and information.

The user device 120, in one embodiment, may include one or more user identifiers associated with hardware of the user device 120, or various other appropriate identifiers. The user identifier may include attributes related to the user 102, such as security information (e.g., user name, password, photograph image, biometric id, address, phone number, etc.). In various implementations, the user identifier may be passed with a user service request to the server device 170, and the user identifier may be used by the server device 170 to provide the user 102 with access to data and information stored by the server device 170.

The user device 120, in various embodiments, may include other applications as may be desired in particular embodiments to provide additional features available to the user 102. For example, such other applications may include security applications for implementing client-side security features, programmatic client applications for interfacing with appropriate application programming interfaces (APIs) over the network 150 or various other types of generally known programs and/or applications.

The user device 120, in one embodiment, may include one or more databases 126 adapted to store and archive data and information including data and information from maintenance documents and/or manuals. In various embodiments, the one or more databases 126 may comprise a removable memory component, such as a smart card, and/or an internal memory component, such as a ROM component. Data and information of maintenance documents for machinery, such as an airplane, may be downloaded from the server device 170 and stored on the user device 120 in the one or more databases 126. In various aspects, the downloaded maintenance documents and/or manuals may be stored in various ways using unique indexes to optimize retrieval. As such, the indexer may use noun phrase collocation and simplified-English specific phrases and/or grammar for indexing and organization.

The server device 170, in one embodiment, comprises a network server adapted to communicate with the user device 120 via the network 150 and to operate as data and information storage facility for transmitting and receiving data and information. The server device 170 may be implemented using any appropriate combination of hardware and/or software configured for wired and/or wireless communication over the network 150. The server device 170 is configured to extract, format and provide relevant data and information for transmission to and reception from the service application 122 of the user device 120.

The server device 170, in one embodiment, may include a processing application 172, a network interface application 174 and one or more databases 176. The network interface application 174, in one embodiment, may comprise a network communication device, module and/or application that allows the server device 170 to communicate with the user device 120 via the network 150 to facilitate transfer of data and information.

The processing application 172, in one embodiment, comprises a data dictionary mechanism that allows translation of part numbers and/or engineering descriptions 192 into searchable data objects 190 that reference stored documents and/or files related to maintenance log book text and maintenance manual text. In one implementation, the user 102 may input into the user device 120 a part number from a particular part of the machinery, such as airplane, and search specific topics in the database 176 of the server device 170. This allows the user 102 to quickly identify and research the particular part directly in data and information related to the particular part of the machinery. In one aspect, the data objects 190 may also reference other related data objects that may be associated with a particular part number or engineering description. For example, an engine part of an airplane may have a plurality of other related engine parts associated with that particular engine part. These other related engine parts may be searchable via the particular engine part.

The database 176, in one embodiment, comprises one or more databases adapted to store and archive data and information including data and information from maintenance documents and/or manuals), which may be downloaded and stored on the user device 120 in database 126. In various implementations, as previously described, downloaded maintenance documents and/or manuals may be stored in various ways using unique indexes to optimize retrieval. As such, the indexer may use noun phrase collocation and simplified-English specific phrases and/or grammar for indexing and organization.

The server device 170, in one embodiment, may include one or more server identifiers, which may be implemented, for example, as operating system registry entries, identifiers associated with hardware of the server device 170, or various other appropriate identifiers that identify the server device 170. The server identifier may include attributes related to a company or organization that provides and/or operates the server device 170 and/or an administrator or operator of the server device 170. The attributes may be implemented as security information (e.g., a company name, address or phone number, or operator name, password, photograph image or biometric id.). In various aspects, the server identifier may be passed with a response to a user request for data and information.

It should be appreciated that, in one embodiment, the user device 120 may be adapted to include one or more applications and/or operations of the server device 170 without departing from the scope of the present disclosure. As such, in one implementation, the service application 122 of the user device 122 may include one or more applications and/or operations of the processing component 172 of the server device 170.

Figure 2:
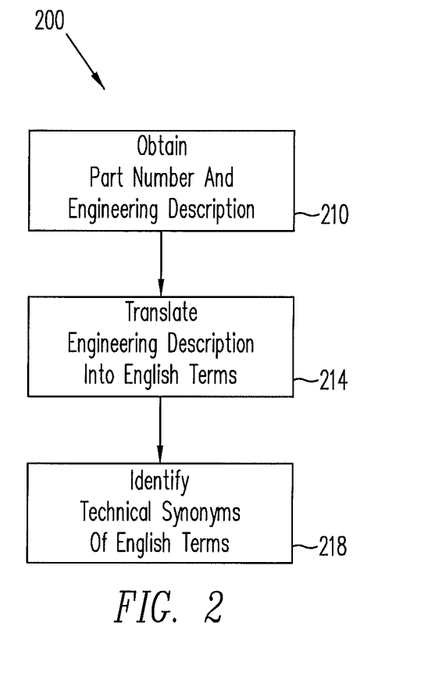
FIG. 2 shows a block diagram of a data relation process, in accordance with an embodiment of the present disclosure.

FIG. 2 shows a block diagram of a data relation process 200, in accordance with an embodiment of the present disclosure. The following description of FIG. 2 should be used in conjunction with the system 100 of FIG. 1.

Referring to FIG. 2, a part number and/or engineering description is obtained (block 210). In one implementation, the user 102 may input a part number into the user device 120, and the service application 122 of the user device 120 may transfer the inputted part number to processing application 172 of the server device 170 via the network 150. The processing application 172 may obtain the engineering description related to the part number from the database 176 of the server device 170. In another implementation, the user 102 may input a part number into the user device 120, and the service application 122 of the user device 120 obtains the engineering description related to the part number from the database 126 of the user device 120. The service application 122 transfers the part number and/or engineering description to processing application 172 of the server device 170 for processing.

Next, the engineering description of the part number is translated into proper English terms, words and/or phrases (block 214). In one implementation, the processing application 172 of the server device 170 translates the engineering description related to the part number from the database 176. The part number and/or engineering description may be stored as part of data object 190 for ease of reference.

One or more technical synonyms of the proper English terms including abbreviations, acronyms and jargon are identified (block 218) and described below. In one implementation, the processing application 172 of the server device 170 may identify the technical synonyms based on information stored in the database 176. For example, the database 176 may comprise a relational database that includes nomenclature, abbreviations, and acronyms related to machine components (e.g., aircraft components). These and other aspects related to the data relation process 200 of FIG. 2 are described in greater detail herein.

Figure 3:
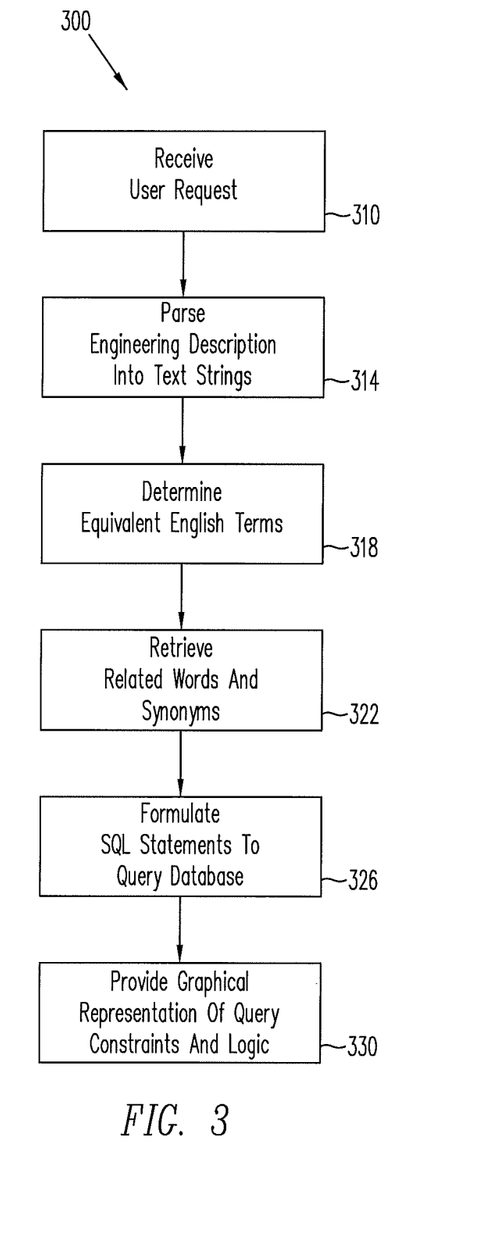
FIG. 3 shows a block diagram of a process for transferring data and information over a network, in accordance with an embodiment of the present disclosure.

FIG. 3 shows a block diagram of a process 300 for transferring data and information over a network, in accordance with an embodiment of the present disclosure. The following description of FIG. 3 should be used in conjunction with the system 100 of FIG. 1.

Referring to FIG. 3, a user request is received (block 310). In one implementation, the processing application 172 of the server device 170 receives a request for data and information from the user 102 via the user device 120 over the network 150.

Next, the engineering description is parsed into text strings (block 314). In one implementation, the processing application 172 of the server device 170 retrieves an engineering description of a particular part from the database 176 and parses the engineering description into text strings. The part number is passed with the user request, and the part number is used to retrieve the engineering description form the database 176.

Next, equivalent English terms are determined (block 318). In one implementation, the processing application 172 of the server device 170 determines equivalent English terms related to the parsed text strings of the engineering description.

Next, related words and synonyms are retrieved (block 322). In one implementation, the processing application 172 of the server device 170 retrieves words and synonyms related to the equivalent English terms as determined from the parsed text strings of the engineering description.

Next, Structured Query Language (SQL) statements are formulated to query the database (block 326). In one implementation, the processing application 172 of the server device 170 is adapted to formulate SQL statements to query the database 176.

Next, one or more graphical representations of query constraints and logic are provided or generated (block 330). In one implementation, the processing application 172 of the server device 170 is adapted to generate graphical representations of query constraints and logic. These and other aspects related to the data relation process 300 of FIG. 3 are described in greater detail herein.

In various embodiments, to extract applicable data from maintenance log book and manual text for the purpose of performing reliability and maintainability analysis, the user 102 (e.g., operator, technician, engineer or analyst) utilizes the processing application 172 and the processes 200, 300 of FIGS. 2, 3, respectively, to determine query keywords for searching the database 176 to translate engineering terms and/or descriptions into search criteria by identifying English word equivalents to engineering terms, descriptions, acronyms and/or abbreviations. For example, an engineering description may read SW FUEL BOOST PUMP LOW PRESS, and the processing application 172 translates this into SWITCH BOOST PUMP PRESSURE. Then, the processing application 172 identifies one or more possible synonyms for these words and defines the query logic (BOOST+ PUMP (or PMP)+PRESSURE (or PRES, or PRESS)+ SWITCH (or SW). In one aspect, the process 300 is an enhancement to common query tools in that it automatically defines search criteria and does not use the industry standard "wild card" approach. These enhancements enable a more user friendly interface, faster processing speeds, and more accurate search results.

In one implementation, the processing application 172 is hosted on an Oracle 10g server device 170, and the database 176 includes one or more reference tables that comprise associations or relations between engineering terms, abbreviations and words. The user 102 (e.g., a maintenance technician) may use proper English as well as industry jargon to search the database 176. In one implementation, a Java interface may be used to run the processing application 172 as a web based application to parse out terms and link one or more possible synonyms in a graphic logic tree. By automatically defining search criteria and logic, the processing application 172, which is used as a data dictionary, enable the user 102 (e.g., an engineer or analyst) to extract a large amount of relevant text information for a given machinery component (e.g., an airplane) or part thereof with less core knowledge.

In one embodiment, the processing application 172 translates engineering component descriptions and definitions (e.g., design engineering acronyms and abbreviations) into proper English words, and the processing application 172 translates English words into operational jargon of machine maintenance technicians.

For example: Part Number, "ASN 28-42-522-201=SW FUEL BOOST PUMP LOW PRES INDG" and translates to, "SWITCH FUEL BOOST PUMP LOW PRESSURE INDICATING".

Figure 4A:
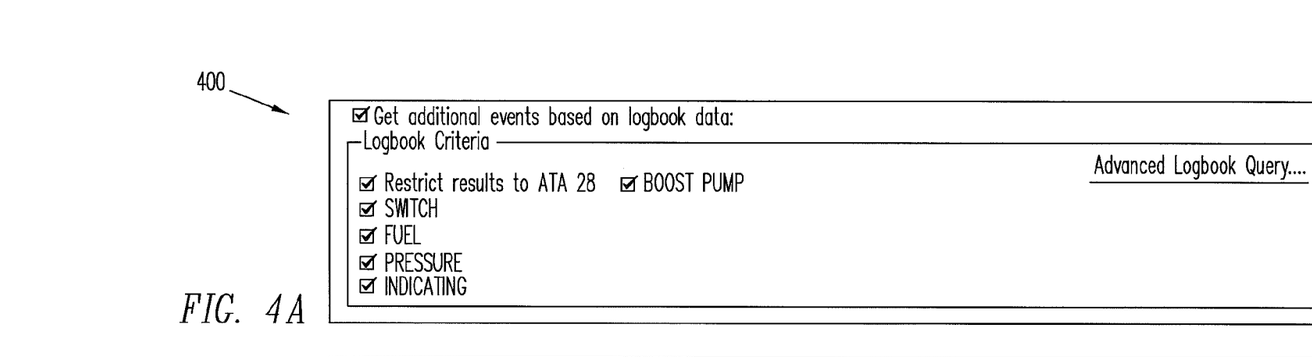
FIGS. 4A and 4B show illustrative diagrams for a user interface, in accordance with various embodiments of the present disclosure.

These translations are based on query requests provided to the processing application 172 of the server device 170 by the user 102 interfacing with the user device 120. In one implementation, a graphical user interface (GUI) is used by the service application 122 of the user device 120 to enhance query results of the processing application 172 of the server device 170. For example, the user 102 may deselect unnecessary criteria to enhance query results in a basic query 400. Referring to FIG. 4A, by deselecting words in the basic query 400, such as "INDICATING," the query is freed from the constraints of the whole description. However, this particular embodiment may not be flexible enough to accommodate the use of operational jargon.

For example: Operational Jargon, "MTC MSG 28-13111" is replaced with, "LTFWD BOOST FUEL PUMP PRESS SWITCH OPS AND LEAK CK GOOD MCO/PLACRD REMOVED".

Therefore, the processing application 172 of the server device 170 may operate as a thesaurus or data dictionary to associate one or more possible synonyms that a technician may use for each technical term. As such, in one implementation, the GUI is used by the service application 122 of the user device 120 to enhance query results of the processing application 172 of the server device 170. For example, referring to FIG. 4B, by including one or more synonyms of the term PRESSURE, an advanced query 450 is adapted to return relevant data and information that may not be identified by a strict keyword search.

Figure 4B:
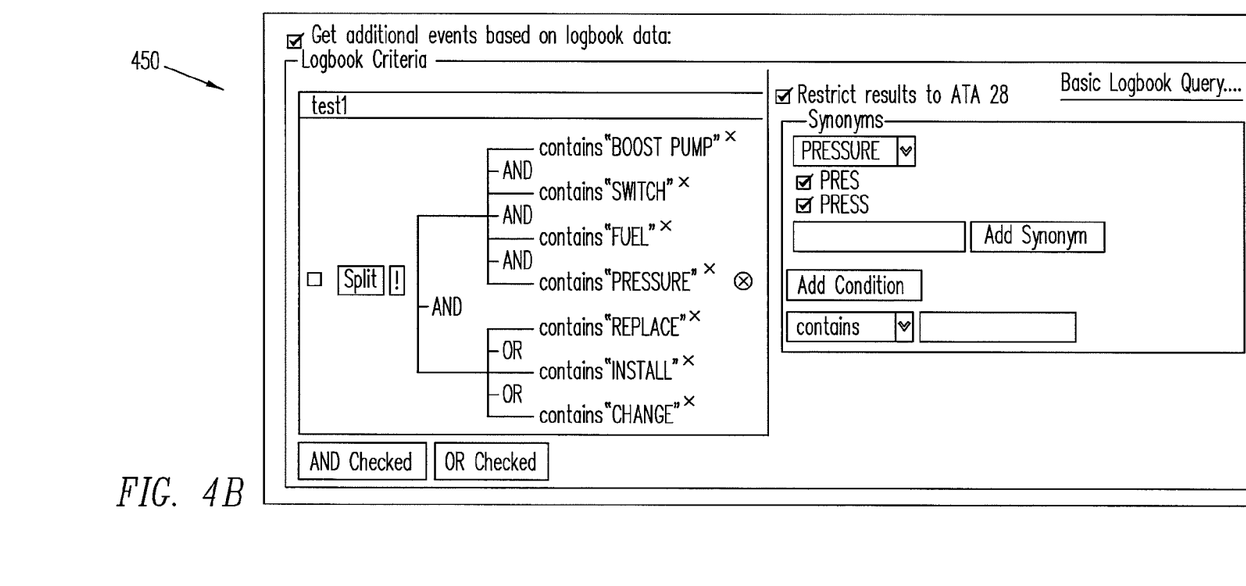

In one implementation, the processing application 172 is adapted to provide one or more synonyms and logic needed to extract relevant data and information with the least amount of user input. The user may elect to omit certain terms from the query criteria through the GUI interface or create an infinite number of word and logic combinations in the advanced query 450, as shown in FIG. 4B.

In one implementation, the processing application 172 uses reference tables comprising abbreviations, acronyms, terms and criteria that is referenced to automatically build a text query from a part number and/or an engineering definition. For example, the processing application 172 uses an acronym table, a thesaurus table, and a stop list or table.

In one embodiment, the acronym table comprises a list of part numbers that include one or more acronyms. In some cases, an acronym may be used in lieu of a long part name.

For example: ASN 27-11-675-011=CON/U, AIL POWER (PCU)(ACTR)

The basic query 400 of FIG. 4A may search for the keywords as follows:

AILERON+POWER+CONTROL+UNIT (and all the synonyms of each term)
—OR—
AILERON+PCU

It is important to distinguish that many part number descriptions do not include an acronym, but in the cases where an acronym exists, this table is referenced to create the "OR" statement.

The thesaurus column is comprised of three columns.
ABBREVIATION
LONG NAME
CRITFERA All the terms in the ABBREVIATION column are unique, unless a "CRITERIA" exists, however a term may occur multiple times in the LONG NAME column. When the same LONG NAME occurs multiple times it forms a one-to-many relationship with the ABBREVIATION column.

For example, the word CONTROL may be abbreviated as CNTL, CNTRL, CONT, CONTL, CONTOL, CONTRL, COTRL, CTL, or CTRL.

| ABBREVIATION | LONG NAME | CRITERIA |
|---|---|---|
| CNTL | CONTROL | |
| CNTRL | CONTROL | |
| CONT | CONTROL | |
| CONTL | CONTROL | |
| CONTOL | CONTROL | |
| CONTRL | CONTROL | |
| COTRL | CONTROL | |
| CTL | CONTROL | |
| CTRL | CONTROL | |

If an ABBREVIATION has multiple meanings the CRITERIA column is used specify which meaning to use (this avoids a many to many relationship). The application references the beginning digits of the part number to determine which term to use.

For example, if the part number starts with "49," then ASC APU STRART CONTROLLER else ASC=AURAL SYNTHESIZER CARD.

| ABBREVIATION | LONG NAME | CRITERIA |
|---|---|---|
| ASC | APU START CONTROLLER | 49 |
| ASC | AURAL SYNTHESIZER CARD | |

The STOPLIST is used as a text analyzer and includes a list of terms that may occur in machine maintenance text but do not include specific component information required in the analysis. These terms may be suppressed from text analysis.

Figure 5:
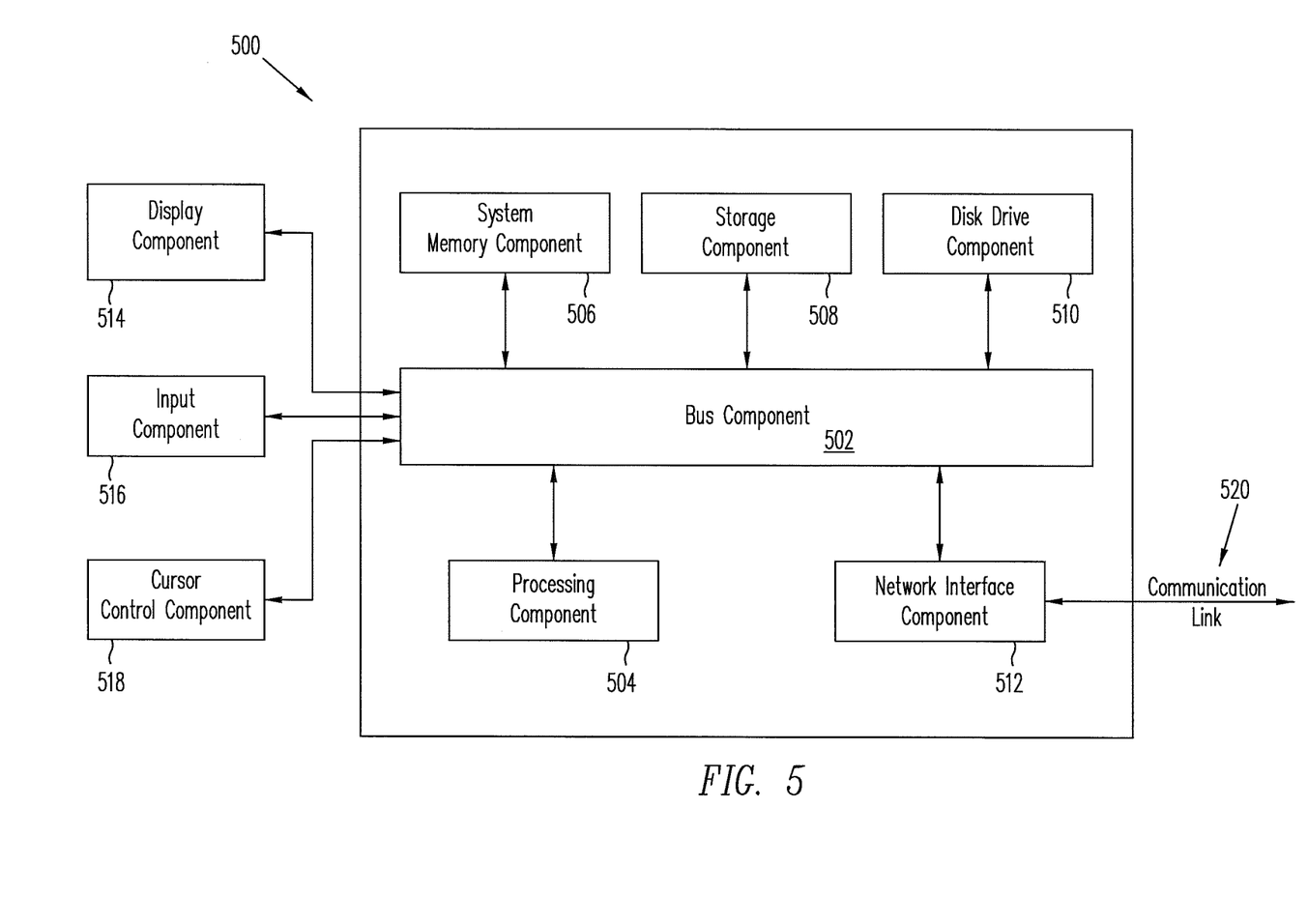
FIG. 5 is a block diagram of a computer system suitable for implementing one or more embodiments of the present disclosure.

FIG. 5 is a block diagram of a computer system 500 suitable for implementing embodiments of the present disclosure. Computer system 500 includes a bus 502 or other communication mechanism for communicating information, which interconnects subsystems and components, such as processor 504, system memory component 506 (e.g., RAM), static storage component 508 (e.g., ROM), memory component 510 (e.g., disk drive or removable ROM memory, such as EEPROM, smart card, flash memory, etc.), wired or wireless communication interface 512 (e.g., transceiver, modem or Ethernet card), display component 514 (e.g., LCD), input component 516 (e.g., keyboard, microphone, touch screen on display), and cursor control component 518 (e.g., mouse button).

In accordance with embodiments of the present disclosure, computer system 500 is adapted to perform specific operations by processor 504 executing one or more sequences of one or more instructions contained in system memory component 506. Such instructions may be read into system memory component 506 from another computer readable medium, such as static storage component 508 or memory component 510. In other embodiments, hard-wired circuitry may be used in place of or in combination with software instructions to implement the present disclosure.

Logic may be encoded in a computer readable medium, which may refer to any medium that participates in providing instructions to processor 504 for execution. Such a medium may take many forms, including but not limited to, non-volatile media, volatile media, and transmission media. In various implementations, non-volatile media includes removable storage media, such as memory component 510, volatile media includes dynamic memory, such as system memory component 506, and transmission media including wireless transceivers. In one example, transmission media may take the form of radio waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 520 (e.g., wireless cell phone network, wireless or wired LAN, PTSN, or various other wireless networks) may perform instruction sequences to practice the present disclosure in coordination with one another.

Computer system 500 may transmit and receive messages, data, information and instructions, including one or more programs (i.e., application code) through communication link 520 and communication interface 512. Received program code may be executed by processor 504 as received and/or stored in removable memory component 510 or some other non-volatile storage component for execution.

Where applicable, one or more embodiments of the present disclosure may be implemented using hardware, software, or various combinations thereof. Where applicable, various hardware components and/or software components set forth herein may be combined into composite components comprising software, hardware, and/or both without departing from the scope and functionality of the present disclosure. Where applicable, various hardware components and/or software components set forth herein may be separated into sub-components having software, hardware, and/or both without departing from the scope and functionality of the present disclosure. Where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, ordering of various steps described herein may be changed, combined into composite steps, and/or separated into sub-steps to provide features described herein.

Embodiments described above illustrate but do not limit the disclosure. It should also be understood that numerous modifications and variations are possible in accordance with the principles of the present disclosure. Accordingly, the scope of the disclosure is defined only by the following claims.

What is claimed is:

1. A system for extracting aircraft maintenance logbook data from aircraft maintenance logbooks according to aircraft engineering component nomenclature, the system comprising:
   a database component for storing the aircraft maintenance logbooks;
   a communication component adapted to communicate with a user via a user device over network; and
   a processor adapted to:
      receive, from the user via the user device over the network, a request to extract the aircraft maintenance logbook data according to the aircraft engineering component nomenclature, wherein at least some of the engineering component nomenclature is abbreviated and wherein the engineering component nomenclature includes an assigned part number (ASN), and
      translate the component nomenclature and the ASN into non-abbreviated proper English language terms,
      translate the non-abbreviated proper English language terms into operational jargon used in the aircraft maintenance logbooks and into one or more synonyms for the operational jargon,
      formulate a database query statement comprising the operational jargon, the one or more synonyms, and the non-abbreviated proper English language terms, and
      retrieve the aircraft maintenance logbook data from the database component using the database query statement,
   wherein the communication component transfers the aircraft maintenance logbook data from the database component to the user device for viewing by the user on the user device, and wherein the processor is further adapted to determine the non-abbreviated proper English terms for the component nomenclature based on at least a portion of the ASN.

2. The system of claim 1, wherein the processor is adapted to identify technical synonyms of the proper English language terms.

3. The system of claim 1, wherein the system comprises a server.

4. The system of claim 1, wherein the user device comprises a mobile communication device having a display component for displaying the transferred aircraft maintenance logbook data or the at least one part thereof.

5. The system of claim 1, wherein the user device comprises a database component for storage of the transferred aircraft maintenance logbook data or the at least one part thereof.

6. The system of claim 1, wherein the user device comprises a user input component that receives input from the user.

7. The system of claim 1, wherein the engineering component nomenclature includes aircraft engineering component acronyms, and wherein the formulated database query statement further comprises the aircraft engineering component acronyms.

8. A method for extracting aircraft maintenance logbook data from aircraft maintenance logbooks according to aircraft engineering nomenclature over a network, the method comprising:

communicating with a user via a user device over the network;

receiving a request to extract the aircraft maintenance logbook data according to the aircraft engineering component nomenclature over the network, wherein at least some of the aircraft engineering component nomenclature is abbreviated and wherein the engineering component nomenclature includes an assigned part number (ASN);

translating the aircraft engineering component nomenclature into non-abbreviated proper English language terms;

translating the non-abbreviated proper English language terms into operational jargon used in the aircraft maintenance logbooks and into one or more synonyms for the operation jargon;

formulating a database query statement comprising the operational jargon, the one or more synonyms, and the non-abbreviated proper English language term; and retrieving the aircraft maintenance logbook data from a database of the aircraft maintenance logbooks using the database query statement; and transferring the aircraft maintenance logbook data to the user device for viewing by the user on the user device, wherein the translating the aircraft engineering component nomenclature comprises determining the non-abbreviated proper English terms for the component nomenclature based on at least a portion of the ASN.

9. The method of claim 8, wherein processing the request includes identifying technical synonyms of the common English language terms.

10. The method of claim 8, wherein the method is performed by a server in communication with the user via the user device over the network.

11. The method of claim 8, wherein the user device comprises a mobile communication device having a display component, a database component and an input component.

12. The method of claim 11, further comprising displaying the aircraft maintenance logbook data to the user via the display component of the user device.

13. The method of claim 11, further comprising storing the aircraft maintenance logbook data in the database component of the user device.

14. The method of claim 11, further comprising receiving input from the user via the input component of the user device.

15. The method of claim 8, wherein the aircraft engineering component nomenclature includes engineering component acronyms, and wherein the formulated database query statement further comprises the aircraft engineering component acronyms.

* * * * *